(12) United States Patent
Yu

(10) Patent No.: US 12,542,753 B2
(45) Date of Patent: Feb. 3, 2026

(54) INTERACTION METHOD AND APPARATUS, AND ELECTRONIC DEVICE

(71) Applicant: Beijing Zitiao Network Technology Co., Ltd., Beijing (CN)

(72) Inventor: Jie Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/381,763

(22) Filed: Oct. 19, 2023

(65) Prior Publication Data

US 2024/0048515 A1 Feb. 8, 2024

Related U.S. Application Data

(63) Continuation of application No. PCT/CN2022/086378, filed on Apr. 12, 2022.

(30) Foreign Application Priority Data

Apr. 20, 2021 (CN) .......................... 202110427758.3

(51) Int. Cl.
*H04L 51/214* (2022.01)
*H04L 51/066* (2022.01)

(52) U.S. Cl.
CPC .......... *H04L 51/214* (2022.05); *H04L 51/066* (2013.01)

(58) Field of Classification Search
CPC ... H04L 51/216; H04L 51/214; H04L 51/066; H04L 51/04; H04L 51/043; G06F 3/01
See application file for complete search history.

(56) References Cited

U.S. PATENT DOCUMENTS

| | | | |
|---|---|---|---|
| 10,187,486 B1 | 1/2019 | Toksoz et al. | |
| 11,924,157 B2* | 3/2024 | Liao | ...................... H04L 51/046 |
| 2003/0163537 A1* | 8/2003 | Rohall | ................ H04L 12/2874 |
| | | | 709/206 |
| 2004/0078445 A1* | 4/2004 | Malik | ...................... H04L 51/04 |
| | | | 709/217 |
| 2005/0144157 A1* | 6/2005 | Moody | ................ G06Q 10/107 |
| 2009/0300517 A1* | 12/2009 | Kaneshiro | ............. G06F 3/0481 |
| | | | 715/752 |

(Continued)

FOREIGN PATENT DOCUMENTS

| | | |
|---|---|---|
| CN | 105049317 A | 11/2015 |
| CN | 110380955 A | 10/2019 |

(Continued)

OTHER PUBLICATIONS

International Patent Application No. PCT/CN2022/086378; Int'l Search Report; dated Jun. 22, 2022; 2 pages.

(Continued)

*Primary Examiner* — Caroline H Jahnige
(74) *Attorney, Agent, or Firm* — BakerHostetler

(57) ABSTRACT

An interaction method and an interaction apparatus are provided. The method includes: receiving an interaction request for processing a target message in an interaction information display page; and in response to the interaction request indicating processing multiple messages, processing the target message and at least one associated message of the target message according to a processing mode indicated by the interaction request.

16 Claims, 6 Drawing Sheets

---

Receive an interaction request for forwarding a target message in an interaction information display page — 101

↓

In response to determining that the interaction request indicates forwarding multiple messages, determine at least one associated message of the target message and forward the target message and the at least one associated message — 102

(56) References Cited

U.S. PATENT DOCUMENTS

| | | | |
|---|---|---|---|
| 2012/0079041 A1 | 3/2012 | Vuong | |
| 2012/0088527 A1* | 4/2012 | Roka | H04L 51/214 |
| | | | 455/466 |
| 2013/0275882 A1* | 10/2013 | Vuong | H04L 51/48 |
| | | | 715/752 |
| 2016/0301643 A1* | 10/2016 | Parashar | H04L 51/214 |
| 2016/0337291 A1* | 11/2016 | Park | H04L 51/214 |
| 2017/0288887 A1* | 10/2017 | Wang | H04W 4/14 |
| 2018/0234371 A1 | 8/2018 | Lande et al. | |
| 2020/0021545 A1 | 1/2020 | Xiao | |
| 2021/0044556 A1 | 2/2021 | Cui et al. | |

FOREIGN PATENT DOCUMENTS

| | | |
|---|---|---|
| CN | 111200650 A | 5/2020 |
| CN | 111339245 A | 6/2020 |
| CN | 111371677 A | 7/2020 |
| CN | 111865760 A | 10/2020 |
| CN | 112311654 A | 2/2021 |
| CN | 112612391 A | 4/2021 |
| JP | 2007206831 A | 8/2007 |
| JP | 2009282962 A | 12/2009 |
| JP | 2016071717 A | 5/2016 |
| JP | 2016524767 A | 8/2016 |
| WO | WO 2018/147747 A1 | 8/2018 |
| WO | WO 2021/012952 A1 | 1/2021 |

OTHER PUBLICATIONS

Liu et al.; "WebSocket MQTT Web"; Computer Systems Application; vol. 25 Issue 5; 2016; p. 28-33 (contains English Abstract).

Zhou et al.; "Understanding the Nature of Social Mobile Instant Messaging in Cellular Networks"; IEEE Communications Letters; vol. 18 No. 3; Mar. 2014; p. 389-392.

Extended European Search Report for European Application No. 22790903.3, mailed Dec. 9, 2024, 11 pages.

European Application No. 22790903.3; Partial Supplementary European Search Report dated Sep. 16, 2024; 12 pages.

Notice of Reasons for Refusal for Japanese Application No. 2023-564089, mailed Nov. 12, 2024, 18 pages.

International Patent Application No. PCT/CN2022/086378; Written Opinion; dated Jun. 22, 2022; 7 pages with English translation.

Notice of Reasons for Refusal for Japanese Application No. 2023-564089, mailed May 27, 2025, 15 pages with machine translation.

* cited by examiner

INTERACTION METHOD AND APPARATUS, AND ELECTRONIC DEVICE

CROSS REFERENCE OF RELATED APPLICATION

The present application claims the priority to Chinese Patent Application No. 202110427758.3, titled "INTERACTION METHOD AND APPARATUS, AND ELECTRONIC DEVICE", filed on Apr. 20, 2021 with the State Intellectual Property Office of the PRC, which is incorporated herein by reference in its entirety.

FIELD

The present disclosure relates to the technical field of internet, and in particular to an interaction method, a communication apparatus and an electronic device.

BACKGROUND

With development of the internet, users may perform information communication over the internet. One user may perform real-time information communication with another user via an instant messaging tool.

During the real-time information communication, the user may actively send information to another user; or may receive information actively sent by another user and reply to the received information.

SUMMARY

This section is provided to introduce the concept briefly, and the concept is described in detail in specific embodiments hereinafter. This section is neither intended to identify key features or necessary features of the claimed technical solutions, nor intended to limit scope of the claimed technical solutions.

An interaction method, an interaction apparatus and an electronic device are provided according to embodiments of the present disclosure.

In a first aspect, an interaction method is provided according to an embodiment of the present disclosure. The method includes: receiving an interaction request for processing a target message in an interaction information display page; and in response to determining that the interaction request indicates processing multiple messages, determining at least one associated message of the target message and processing the target message and the at least one associated message according to a processing mode indicated by the interaction request.

In a second aspect, an interaction method is provided according to an embodiment of the present disclosure. The method includes: receiving a message processing operation, and displaying preset message processing control when a message displayed on a page satisfies a preset condition, where the preset condition includes: the number of messages currently displayed on the page is greater than a preset number, and/or a message currently selected has a reply relationship with other message; determining multiple messages selected in response to triggering of the message processing control, wherein the selected multiple messages include a preset number of message, or a message having a reply relationship with the message currently selected; and performing processing indicated by the message processing operation on the selected multiple messages.

In a third aspect, an interaction apparatus is provided according to an embodiment of the present disclosure. The apparatus includes: a first receiving unit and a forwarding unit. The first receiving unit is configured to: receive an interaction request for forwarding a target message in an interaction information display page. The forwarding unit is configured to: in response to determining that the interaction request indicates processing multiple messages, determine at least one associated message of the target message and process the target message and the at least one associated message according to a processing mode indicated by the interaction request.

In a fourth aspect, an interaction apparatus is provided according to an embodiment of the present disclosure. The interaction apparatus includes a second receiving unit, a determining unit and a performing unit. The second receiving unit is configured to: receive a message processing operation, and display preset message processing control when a message displayed on a page satisfies a preset condition, where the preset condition includes: the number of messages currently displayed on the page is greater than the preset number, and/or a message currently selected has a reply relationship with other message. The determining unit is configured to: determine multiple messages selected in response to triggering of the message processing control, where the selected multiple messages include a preset number of message, or a message having a reply relationship with the message currently selected. The performing unit is configured to perform processing indicated by the message processing operation on the selected multiple messages.

In a fifth aspect, an electronic device is provided according to an embodiment of the present application. The electronic device includes: one or more processors; and a storage apparatus configured to store one or more programs. The one or more programs, when being executed by the one or more processors, cause the one or more processors to implement the interaction method according to the first aspect or the second aspect.

In a sixth aspect, a computer readable medium storing computer programs is provided according to an embodiment of the present disclosure. The computer programs are executed by a processor to implement the interaction method according to the first aspect or the second aspect.

According to the interaction method, the interaction apparatus and the electronic device provided in the embodiments of the present disclosure, an interaction request for forwarding the target message is received in the interaction information display page. In response to determining that the interaction request indicates forwarding multiple messages, at least one associated message of the target message is determined. The target message and the at least one associated message are forwarded according to one forwarding interaction request. In the conventional technology, a user searches for multiple associated messages, selects the multiple associated messages, and then forwards the multiple associated messages. According to the solution of the present disclosure, the associated message of the target message can be automatically determined, and the associated message and the target message are forwarded together automatically, thereby simplifying an operation of forwarding multiple associated messages for the user and thus improving user experience.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
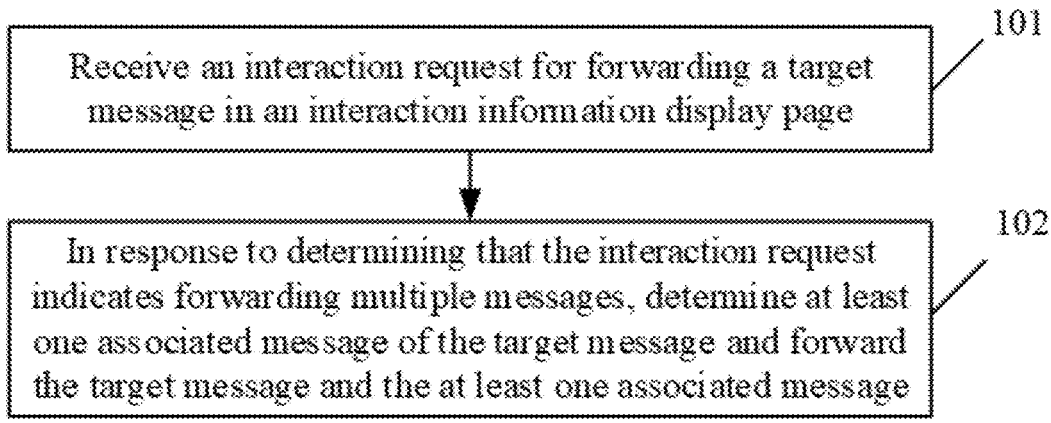
FIG. 1 is a flowchart of an interaction method according to an embodiment of the present disclosure.

Reference is made to FIG. 1 which is a flowchart of an interaction method according to an embodiment of the present disclosure. The following description is made by taking message forwarding as an example. As shown in FIG. 1, the method includes steps 101 and 102 as follows.

In step 101, an interaction request for forwarding a target message is received in an interaction information display page.

The interaction information display page herein may be a display page for information interaction between users displayed in an instant messaging tool, or an interaction information display page displayed in a browser.

The target message may be any message in interaction messages.

The interaction request for forwarding the target message may be sent to a performing body performing the interaction method. For example, the user may perform a preset information forwarding operation on the target message, to send the interaction request to the performing body.

The preset message forwarding operation may include various information forwarding operations. For example, when the user clicks the target message by right key, information forwarding options are displayed, and the user selects the information forwarding option.

The information forwarding option may include an option indicating forwarding a single message and an option indicating forwarding multiple messages.

When the user selects the option indicating forwarding a single message, it is determined that the interaction request indicates forwarding a single message. When the user selects the option indicating forwarding multiple messages, it is determined that the interaction request indicates forwarding multiple messages.

In step 102, in response to determining that the interaction request indicates forwarding multiple messages, at least one associated message of the target message is determined and the target message and the at least one associated message are forwarded.

After the interaction request information is received, the at least one associated message of the target message may be determined from the interaction information by using multiple manners.

In some implementations, the associated message may be a message having a reply relationship with the target message.

In some implementations, step 102 may include sub-step 1021: in response to determining that the interaction request indicates forwarding multiple messages, determining at least one associated message of the target message according to a reply relationship between messages.

In response to determining that the interaction request indicates forwarding multiple messages, the performing body of the interaction method may search a page for multiple candidate messages having a reply relationship between each other; and then determine multiple associated messages having the reply relationship with the target message from the multiple candidate messages.

In another embodiment, it may be determined, in real time or periodically, whether the sent message has the reply relationship with the target message.

In some application scenarios, the at least one associated message includes an initial message to which the target message replies. In these application scenarios, the initial message may be determined as the associated message of the target message, according to a reply relationship between the target message and the initial message.

In other application scenarios, the at least one associated message includes a reply message for replying to the target message. In these application scenarios, the reply message is determined as the associated message of the target message, according to a reply relationship with the target message.

In an implementation, messages in the page or a reply relationship between the messages may be pre-stored by the performing body of the interaction method or an electronic device in communication connection with the performing body.

In the implementation, sub-step 1021 may include: determining at least one associated message of the target message based on the pre-stored reply relationship.

The pre-stored reply relationship is obtained by: determining the reply relationship between messages according to a message reply operation. The reply relationship includes a direct reply relationship and/or an indirect reply relationship.

When it is detected that the user performs a message reply operation, it may be determined that a relationship between a current replying message replied by the reply operation and a replied message is the reply relationship. A direct reply relationship exists between a replied message and a replying message referred by the reply operation.

If the replied message is a historical replying message of another message, it is determined that an indirect reply relationship exists between a current replying message and the another message.

When the reply relationship between messages is determined according to the message reply operation, the reply relationship may be stored. The reply relationship may be stored in a storage space of the performing body, or may be stored in an electronic device establishing communication connection with the performing body.

After a request for forwarding multiple messages for the target message is received, at least one associated message of the target message may be determined according to the reply relationship pre-stored in the performing body or the electronic device establishing communication connection with the performing body.

In some implementations, the multiple messages displayed on the page are stored in a message list. In the message list, each message corresponds to a first message identifier and a second message identifier. A first message identifier of one message indicates the message, and a second message identifier of the one message indicates a first message identifier of a message to which the message reply. The process of determining at least one associated message of the target message according to a reply relationship between messages includes: determining, in the message list, at least one associated message having a direct or indirect reply relationship with the target message, according to the second message identifiers of the multiple messages.

In these implementations, the performing body may perform the following searching operations in the message list.

First, a direct reply message and an indirect reply message for replying to the target message are determined.

In some embodiments, the direct reply message and the indirect reply message for replying to the target message are determined according to the first message identifier of the target message and the first message identifier and the second message identifier of other message.

The first message identifier of the target message is determined, and then the message list is searched for first other message for which a second message identifier points to the first message identifier of the target message. The first other message is determined as a first associated message having a first direct reply relationship with the target message. Then, a first message identifier of the first associated message is determined, and the message list is searched for a second other message for which the second message identifier points to the first message identifier of the first associated message. The second other message is determined as a second associated message having a first indirect reply relationship with the target message. Then, a first message identifier of the second associated message is determined, and the message list is searched for a third other message for which the second message identifier points to the first message identifier of the second associated message. The third other message is determined as a third associated message having a second indirect reply relationship with the target message. The above process is repeated until all indirect reply messages having the indirect reply relationship with the target message are found.

Second, a direct replied message and an indirect replied message of the target message are determined.

In some embodiments, the direct replied message and the indirect replied message of the target message may be determined according to the second message identifier of the target message and the first message identifier and the second message identifier of other message.

A message indicated by the second message identifier of the target message is determined as the direct replied message.

A message indicated by the second message identifier of the direct replied message is determined as the first indirect replied message.

A message indicated by the second message identifier of the first indirect replied message is determined as the second indirect replied message. The above process is repeated until all indirect replied messages of the target message are found.

In some implementations, the at least one associated message of the target message is a message belonging to a same subject with the target message.

Different users may perform message interaction on a same subject. When one message among interaction messages of the subject is determined as the target message, other message among the interaction messages of the subject may serve as the at least one associated message of the target message.

In some application scenarios, multiple messages of the same subject including the target message may be displayed on a subject message page or an associated page of the subject message page. In these application scenarios, other message involved in the subject message page may serve as the associated message of the target message.

The target message and the at least one associated message may be forwarded to a target user indicated by the interaction request.

According to the interaction method provided in the embodiments of the present disclosure, the interaction request for forwarding the target message is received in the interaction information display page. According to the interaction request, at least one associated message of the target message is determined. The target message and the at least one associated message are forwarded according to one forwarding interaction request. In the conventional technology, the user searches for multiple associated messages, selects the multiple associated messages, and then forwards the multiple associated messages. According to the solution of the present disclosure, the associated message of the target message can be automatically determined, and the associated message and the target message are forwarded together automatically, thereby simplifying an operation of forwarding multiple associated messages for the user and thus improving user experience.

Figure 2:
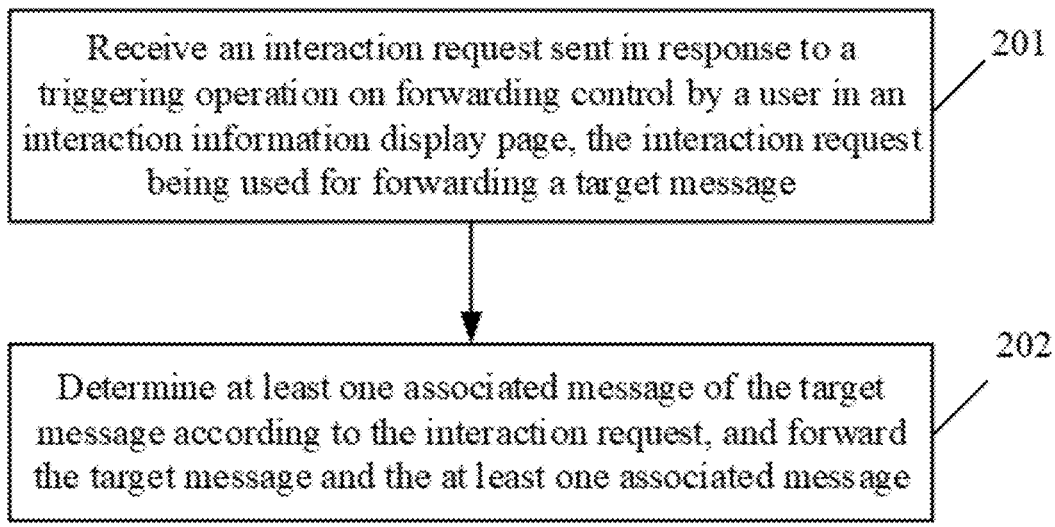
FIG. 2 is a flowchart of an interaction method according to another embodiment of the present disclosure.

Reference is made to FIG. 2 which is a flowchart of an interaction method according to another embodiment of the present disclosure. As shown in FIG. 2, the interaction method includes steps 201 and 202 as follows.

In step 201, in an interaction information display page, an interaction request sent in response to a triggering operation on forwarding control from a user is received. The interaction request is used for forwarding a target message.

In the embodiment, forwarding control corresponding to the target message may be displayed in the interaction information display page. The forwarding control is configured to indicate forwarding multiple messages. For example, when the user performs a triggering operation on the forwarding control, messages corresponding to the forwarding control may be forwarded.

It should be understood that, another forwarding control for indicating forwarding a single message may be displayed in the interaction information display page.

In the embodiment, the user may perform a triggering operation on the forwarding control, to send an interaction request for forwarding the target message to the performing body of the interaction method.

In some implementations, the page further includes messages other than the target message and the associated message of the target message. In these application scenarios, the forwarding control is arranged at an associated position of the target message and/or the associated message of the target message.

The associated position herein may be positions on top, bottom, the left or the right of the message. Preferably, the associated position may be a position on the right of the message or a position on upper right or lower right of the message, or may be a position displayed on upper left or lower left of the message according to setting of the user.

In some application scenarios, the associated message may be a reply message of the target message, and a display region of the associated message may include at least a part of the target message. The forwarding control may be arranged at the associated position in the display region of the associated message.

It should be understood that the forwarding control may be displayed in response to detecting a preset triggering operation performed on the target message and/or the associated message of the target message by the user.

The preset triggering operation may include but not limited to clicking and touch, for example.

Figure 3:
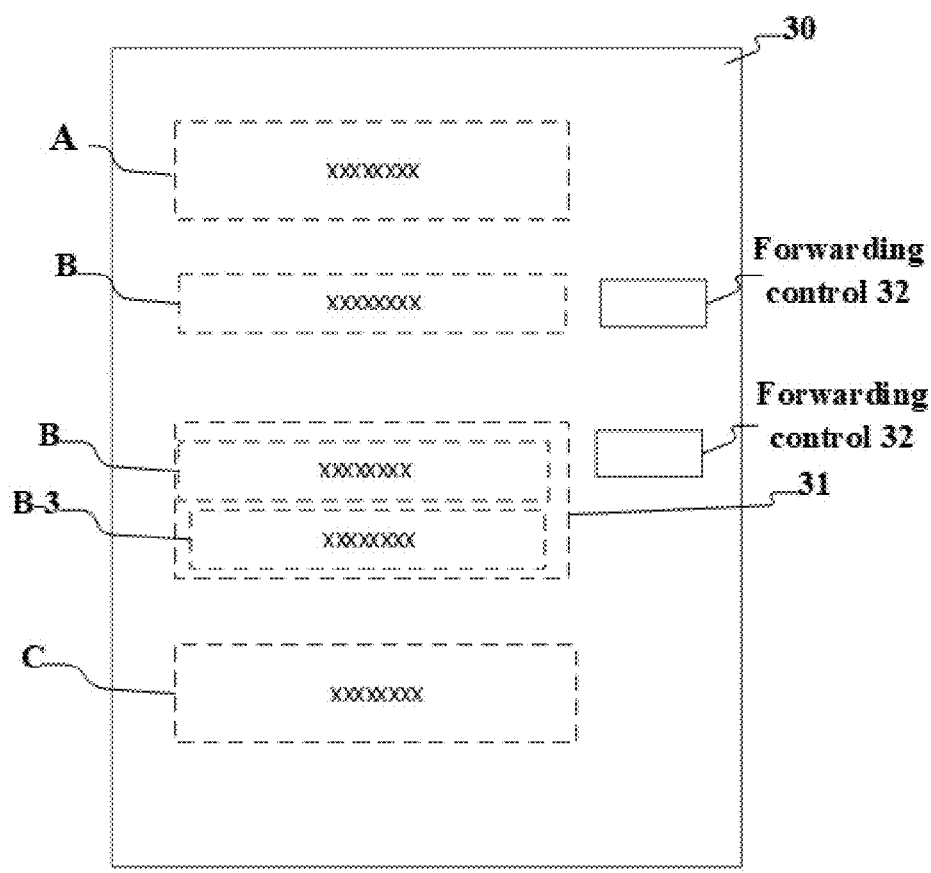
FIG. 3 is a schematic diagram of some application scenarios of the interaction method according to an embodiment of the present disclosure.

An interaction information display page 30 shown in FIG. 3 may include multiple messages A, B, B-3 and C, where messages B and B-3 may be associated messages. Message B may be a target message. A first display region 31 is a display region of the target message B and the associated message B-3. A part of the target message may be displayed in the first display region.

The forwarding control 32 may be arranged on the right of the target message B, or may be arranged on the right of the first display region 31. When a user performs a triggering operation on forwarding control, an interaction request for forwarding the target message may be triggered.

In some implementations, the interaction information display page includes an associated information detail display interface. The forwarding control is displayed in a first preset region of the associated information detail display interface.

Detailed information of the target message and the at least one associated message of the target message is displayed in the associated information detail display interface.

The associated information detail display interface is opened by: displaying the associated information detail page in response to a first preset operation performed on a preset identification corresponding to the target message or the associated message by the user in the first information interaction interface.

The preset identification herein may include an identification for indicating that the target message has a reply message, or an identification for indicating that the associated message is a reply message of the target message.

The first preset operation includes but not limited to clicking, touch and so on.

In an implementation, the forwarding control is displayed in the first preset region of the detail display interface.

In the implementation, the forwarding control may be displayed in the detail display interface. The first preset region may be any region set in advance. For example, the first preset region is located on top of the detail display page.

Figure 4:
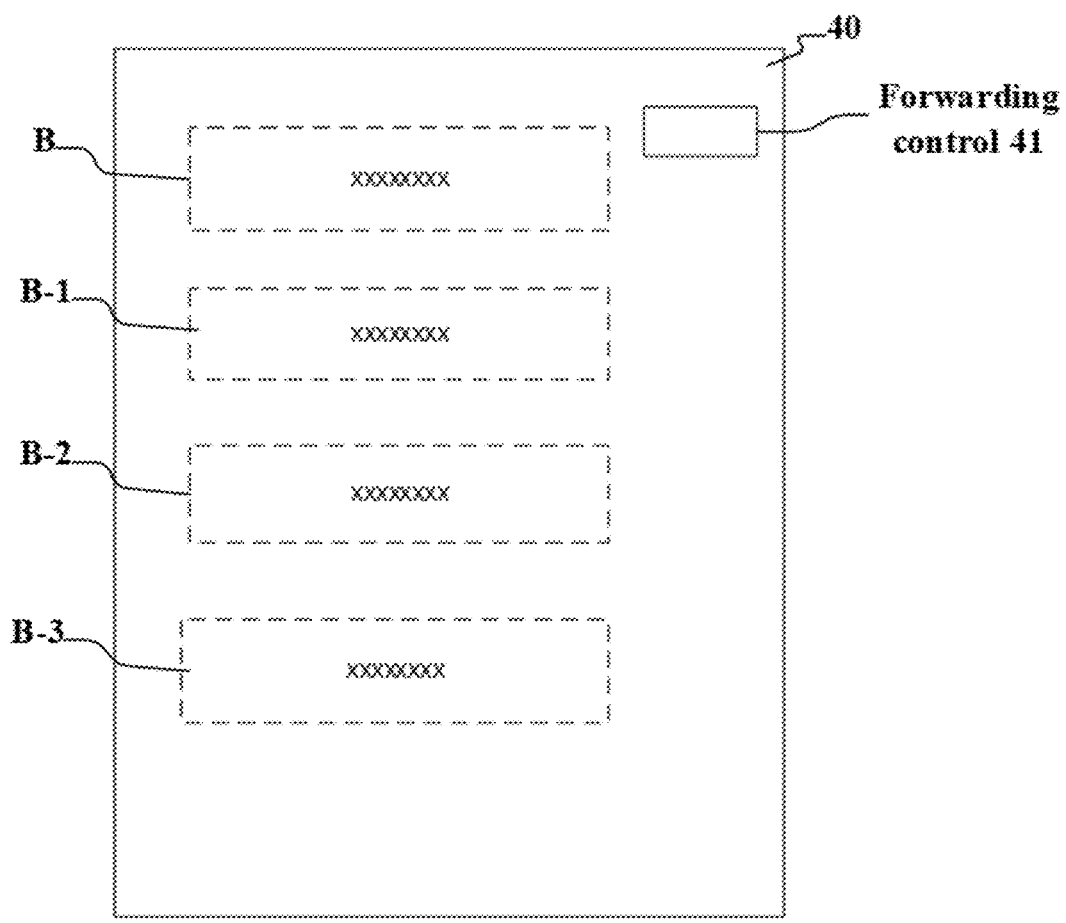
FIG. 4 is a schematic diagram of other application scenarios of the interaction method according to an embodiment of the present disclosure.

An interaction information display page 40 shown in FIG. 4 may be a detail display page, and may include multiple messages B, B-1, B-2 and B-3, where messages B, B-1, B-2 and B-3 may be associated messages. Message B may be a target message. The forwarding control 41 is displayed at upper right and on top of the interaction information display page 40. When the user performs a triggering operation on the forwarding control 41, the interaction request may be sent.

In step 202, according to the interaction request, at least one associated message of the target message is determined, and the target message and the at least one associated message are forwarded.

In the embodiment, the at least one associated message of the target message may be determined by using multiple manners.

For the process of determining at least one associated message of the target message in step 202, one may refer to related illustration of step 102 in the embodiment shown by FIG. 1, and details are not repeated herein.

The target message and the at least one associated message are forwarded to a target user indicated by the interaction request. It should be understood that the target user may be not limited to one user.

Compared with the interaction method provided in the embodiment shown by FIG. 1, the forwarding control is displayed in the interaction information display page, and the operation of forwarding the target message and the at least one associated message by the user is simplified in the method provided in this embodiment.

In some implementations of the interaction method according to the present disclosure, step 102 in the embodiment shown by FIG. 1 and step 202 in the embodiment shown by FIG. 2 further include: determining identification information based on the target message and the at least one associated message. The identification message indicates attribute information of the target message and the at least one associated message.

The identification message facilitates identification and management of the forwarded target message and at least one associated message.

The identification message may be displayed on a client of a user receiving the forwarded target message and at least one associated message of the target message, so that the user can quickly know the forwarded messages.

The attribute information includes dialogue user information and/or dialogue subject information of a dialogue including the target message and the associated message.

The dialogue information may include at least one of: sender information and/or receiver information of the target message, sender information and/or receiver information of the associated message, and a name information of a chat group if the dialogue is group chat.

The dialogue subject information may include a predetermined message character in the target message and the associated message, for example characters of an initial message among multiple messages having a reply relationship. In other words, the multiple messages each are direct reply messages or indirect reply messages of the initial message, so that the user can conveniently know the subject discussed in the multiple messages having the reply relationship.

In some implementations, identifiers are set for the forwarded target message and at least one associated message. On one hand, the user can conveniently know the forwarded message; and on the other hand, the forwarded message can be managed conveniently.

In some implementations of the interaction method according to the present disclosure, the target message and the at least one associated message include at least one first to-be-processed message of which a format is to be converted. The first to-be-processed message may include but not limited to, for example, a schedule card, a card message, a red envelope, a general calendar service or a video call message.

In some implementations, step 102 in the embodiment shown by FIG. 1 and step 202 in the embodiment shown by FIG. 2 further include the following steps.

First, according to the interaction request, the format of the first to-be-processed message is converted according to a preset format converting rule.

The first to-be-processed message can be sent after the format is converted. Therefore, after the interaction request is received, the first to-be-processed message among the target message or to-be-processed messages may be subjected to format converting, and then the processed information is forwarded. It is assumed that the first to-be-processed message is a red envelope message. The red envelope message may be processed into a preset number of fields. The preset number of fields include a text field representing that information is a red envelope message. Fields other than the text field may be expressed by preset symbols.

When the target message and the at least one associated message are forwarded, the first to-be-processed message subjected to format converting is forwarded.

For the first to-be-processed message, the first to-be-processed message subjected to format converting may be forwarded when the target message and the at least one associated message are forwarded.

In these implementations, after the first to-be-processed message is subjected to the format converting, the first to-be-processed message is forwarded together with other message among the target message and the at least one associated message, thereby maintaining integrity of the message. In addition, the first to-be-processed message is forwarded after format converting, thereby reducing an amount of data forwarded.

In some implementations of the interaction method according to the present disclosure, the at least one associated message includes at least one non-forwardable second target message. The non-forwardable message may be a message withdrawn by the user sending the message.

In these implementations, step 102 in the embodiment shown by FIG. 1 and step 202 in the embodiment shown by FIG. 2 further include: forwarding messages other than the second target message.

In these implementations, the non-forwardable message among the target message and the at least one associated message of the target message is filtered out, so that the forwarded message is valid.

Figure 5:
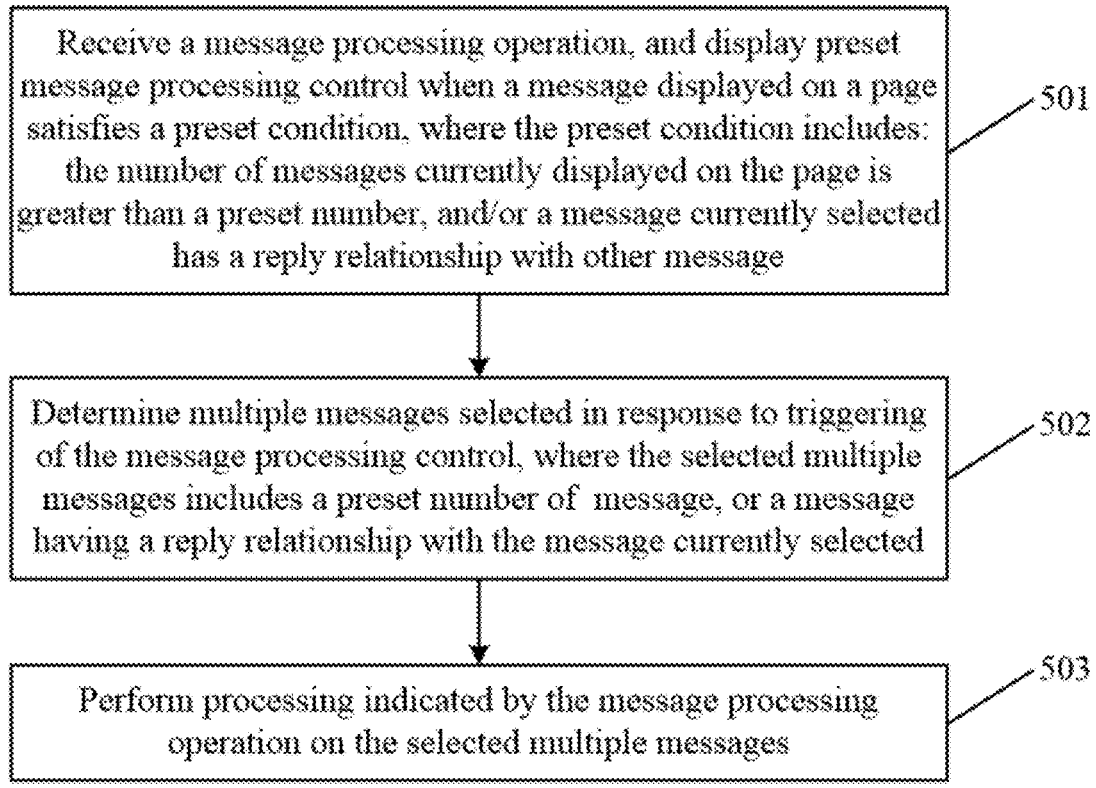
FIG. 5 is a flowchart of an interaction method according to an embodiment of the present disclosure.

Reference is made to FIG. 5 which is a flowchart of an interaction method according to an embodiment of the present disclosure. As shown in FIG. 5, the interaction method includes steps 501 to 503 as follows.

In step 501, a message processing operation is received, and preset message processing control is displayed when a message displayed on a page satisfies a preset condition. The preset condition includes: the number of messages currently displayed on the page is greater than a preset number, and/or a message currently selected has a reply relationship with other message.

In step 502, multiple messages selected are determined in response to triggering of the message processing control. The selected multiple messages include a preset number of message, or a message having a reply relationship with the message currently selected.

The message processing operation may include but not limited to a selection operation, a forwarding operation and so on.

A performing body of the interaction method may receive a message processing operation performed on a page by a user, and determines whether the message displayed on the page satisfies a preset condition. That is, when an information selection operation performed on the page by the user is received, it may be determined whether the number of messages displayed currently on the page is greater than the preset number. If the number of the messages currently displayed is greater than the preset number, it is determined that the message displayed on the page satisfies the preset condition. In an embodiment, when the information selection operation performed on the page by the user is received, it may be determined whether the message currently selected on the page has a reply relationship with other message. If it is determined that the message currently selected on the page has the reply relationship with other message, it is determined that the message displayed on the page satisfies the preset condition. In an embodiment, when the information selection operation performed on the page by the user is received, it may be determined whether the number of messages currently displayed on the page is greater than the preset number, and whether the message currently selected has a reply relationship with other message. If it is determined that the number of messages currently displayed on the page is greater than the preset number and the message currently selected has the reply relationship with other message, it is determined that the message displayed on the page satisfies the preset condition.

The preset number may be any integer greater than 1, for example 5 or 10. The preset number may be set according to the specific application scenario, and is not limited herein.

When the message displayed on the page satisfies the preset condition, preset message processing control may be displayed. In these application scenarios, the preset message processing control may be configured to select multiple messages.

The message processing control may be triggered in response to operations performed on the message processing control, such as clicking or hold-in scrolling.

Multiple messages may be selected simultaneously when the message processing control is triggered once.

In an embodiment, the message processing control may be triggered by hold-in scrolling the message processing control. Step 502 may include: when the number of message selected in response to the triggering of the message processing control is greater than the preset number, determining the preset number of messages starting from a message corresponding to a triggering starting time instant as the multiple messages selected in response to the triggering of the message processing control.

The process of determining the preset number of messages starting from a message corresponding to a triggering starting time instant as the multiple messages selected in response to the triggering of the message processing control includes: selecting the preset number of messages starting from the message corresponding to the triggering starting time instant, in a selection order indicated by a triggering operation performed on the message processing control.

The triggering starting time instant is a time instant when a triggering operation is detected.

The process of determining the preset number of messages starting from a message corresponding to the starting time instant may include: selecting the preset number of messages in a selection order indicated by the triggering operation performed on the message processing control.

The selection order indicated by the triggering operation performed on the message processing control may include: an order of message receiving time starting from the initial message, or a reverse order of message receiving time starting from the initial message.

When the number of messages involved in one triggering on the message is greater than the preset number, the preset number of messages starting from the message corresponding to the starting time instant of the triggering operation may be automatically determined as the multiple messages selected in response to triggering of the message processing control.

The interaction method further includes: displaying prompt information indicating that the number of messages selected in response to triggering of the message processing control is greater than the preset number.

In some implementations, the interaction method further includes: displaying a message direct control on the page, where the message direct control is configured to highlight a last message of the selected multiple messages on a current page in response to a triggering operation of the user.

In these implementations, operations such as clicking or touch may be performed on the message direct control. When the triggering operation performed on the message direct control is received, a last message of messages selected by the information selection operation and an adjacent message of the last message are displayed on the current page. In which, the last message of the messages selected by the information selection operation is highlighted. For example, a background color of the last message may be set to be different from a background color of other message.

In step 503, processing indicated by the message processing operation is performed on the selected multiple messages.

Processing indicated by the message processing operation may be performed on the selected multiple messages.

The message processing operation may be an information selection operation, and the processing indicated by the message processing operation is: performing selection on the selected multiple messages.

The message processing operation may be a forwarding operation, and the processing indicated by the message processing operation is forwarding the selected multiple messages.

According to the information interaction method in the embodiment, the information processing operation is received, and the preset message processing control is displayed when the message displayed on the page satisfies the preset condition. The preset condition includes: the number of messages currently displayed on the page is greater than the preset number, and/or the message currently selected has a reply relationship with other message. The selected multiple messages are determined in response to triggering of the message processing control. The selected multiple messages include the preset number of message, or the message having the reply relationship with the message currently selected. The processing indicated by the message processing operation is performed on the selected multiple messages. In this way, when the message processing operation is received, multiple messages are selected according to the preset message processing control displayed in response to determining that the message displayed on the page satisfies the preset condition, and the processing indicated by the message processing operation is performed on the selected multiple messages, so that it is unnecessary to process the multiple messages one by one, thereby simplifying the user operation and reducing the time consumed by processing the multiple messages by the user.

Figure 6:
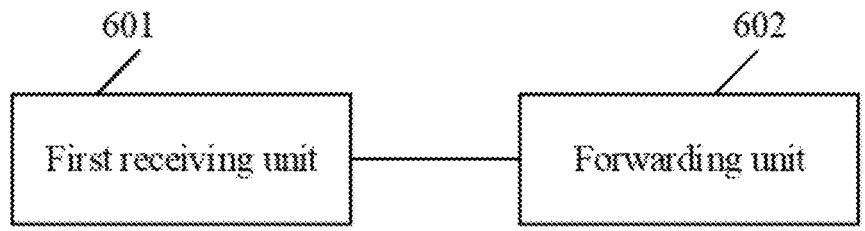
FIG. 6 is a schematic structural diagram of an interaction apparatus according to an embodiment of the present disclosure.

Reference is made to FIG. 6 which shows an interaction apparatus according to an embodiment of the present disclosure. The apparatus is configured to implement the method described above. The apparatus embodiment corresponds to the method embodiment shown by FIG. 1. The apparatus may be applied to various electronic devices.

As shown in FIG. 6, the interaction apparatus according to this embodiment includes a first receiving unit 601 and a forwarding unit 602. The first receiving unit 601 is configured to receive an interaction request for forwarding a target message in an interaction information display page. The forwarding unit 602 is configured to: in response to determining that the interaction request indicates forwarding multiple messages, determine at least one associated message of the target message and forward the target message and the at least one associated message.

In the embodiment, for specific processing and resulting technical effects of the first receiving unit 601 and the forwarding unit 602 of the interaction apparatus, one may refer to related illustration of step 101 and step 102 in the embodiment shown by FIG. 1. Details are not repeated herein.

In some implementations, the first receiving unit 601 is further configured to: receive an interaction request sent in response to a triggering operation on forwarding control from a user, where the forwarding control corresponds to the target message and is configured to forward the multiple messages.

In some implementations, the page further includes a message other than the target message and the associated message of the target message, and the forwarding control is arranged at an associated position of the target message, and/or an associated position of the associated message of the target message.

In some implementations, the interaction information display page includes an associated information detail display interface, the forwarding control is displayed in a first preset region of the associated information detail display interface; and the associated information detail display interface displays details of the target information and the at least one associated information. The associated information detail display interface is opened by: displaying the associated information detail page in response to a first preset operation performed on a preset identification corresponding to the target message or the associated message by the user in a first information interaction interface.

In some implementations, the forwarding unit 602 is further configured to: determine identification information based on the target message and the at least one associated message, where the identification information indicates attribute information of the target message and the at least one associated message.

In some implementations, the attribute information includes dialogue user information and/or dialogue subject information of a dialogue including the target message and the associated message.

In some implementations, the dialogue user information includes at least one of: sender information and/or receiver information of the target message, sender information and/or receiver information of the associated message, and a name information of a chat group if the dialogue is group chat. The dialogue subject information includes a predetermined message character in the target message and the associated message.

In some implementations, the target message and the at least one associated message includes at least one first to-be-processed message of which a format is to be converted. The forwarding unit 602 is further configured to: convert, in response to the interaction request, the format of the first to-be-processed message according to a preset format conversion rule; and process the first to-be-processed message after format conversion when forwarding the target message and the at least one associated message.

In some implementations, the at least one associated message includes at least one non-forwardable second target message. The forwarding unit 602 is further configured to: forward a message other than the second target message.

In some implementations, the forwarding unit 602 is further configured to: in response to determining that the interaction request indicates forwarding multiple messages, determining at least one associated message of the target message according to a reply relationship between messages. The at least one associated message includes a message having the reply relationship with the target message.

In some implementations, the forwarding unit 602 is further configured to: determine at least one associated message of the target message based on a pre-stored reply relationship. The pre-stored reply relationship is obtained by: determining the reply relationship between messages according to a message reply operation, where the reply relationship includes a direct reply relationship and/or an indirect reply relationship.

In some implementations, the multiple messages displayed in the page are stored in a message list, each message in the message list corresponds to a first message identifier and a second message identifier. A first message identifier of one message indicates the message and a second message identifier of the one message indicates a first message identifier of a message replied by the one message. The forwarding unit 602 is further configured to: determine, in the message list, at least one associated message having a direct or indirect reply relationship with the target message according to the second message identifiers corresponding to the multiple messages.

In some implementations, the forwarding unit 602 is further configured to: determine a direct reply message and an indirect reply message of the target message, according to the first message identifier of the target message and the first message identifier and the second message identifier of other message; and/or determine a direct replied message and an indirect replied message of the target message, according to the second message identifier of the target message and the first message identifier and the second message identifier of other message.

In some implementations, the multiple messages in the associated information detail display interface have a direct reply and/or indirect reply relationship with the target message.

In some implementations, the at least one associated message of the target message includes a message belonging to a same subject with the target message.

Figure 7:
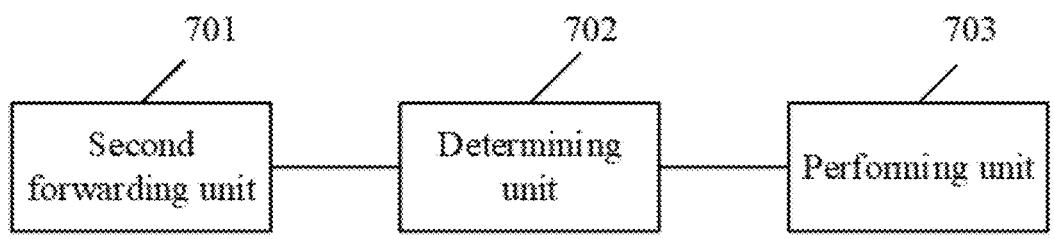
FIG. 7 is a schematic structural diagram of an interaction apparatus according to another embodiment of the present disclosure.

Reference is made to FIG. 7 which shows an interaction apparatus according to an embodiment of the present disclosure. The apparatus is configured to implement the method described above. This apparatus embodiment corresponds to the method embodiment shown by FIG. 5. The apparatus may be applied to various electronic devices.

As shown in FIG. 7, the interaction apparatus according to this embodiment includes a second receiving unit 701, a determining unit 702 and a performing unit 703. The second receiving unit 701 is configured to receive a message processing operation, and display preset message processing control when a message displayed on a page satisfies a preset condition. The preset condition includes: the number of messages currently displayed on the page is greater than a preset number, and/or a message currently selected has a reply relationship with other message. The determining unit 702 is configured to determine multiple messages selected in response to triggering of the message processing control. The selected multiple messages include a preset number of message, or a message having a reply relationship with the message currently selected. The performing unit 703 is configured to perform processing indicated by the message processing operation on the selected multiple messages.

In the embodiment, for specific processing and resulting technical effects of the second receiving unit 701, the determining unit 702 and the forwarding unit 703 of the interaction apparatus, one may refer to related illustration of step 501, step 502 and step 503 of the embodiment shown by FIG. 5. Details are not repeated herein.

In some implementations, the determining unit 702 is further configured to: when the number of message selected in response to the triggering of the message processing control is greater than the preset number, determine the preset number of messages starting from a message corresponding to a triggering starting time instant as the multiple messages selected in response to the triggering of the message processing control. The interaction apparatus further includes a first display unit (not shown). The first display unit is configured to: display prompt information indicating that the number of message selected in response to the triggering of the message processing control exceeds the preset number.

In some implementations, the interaction apparatus further includes a second display unit (not shown). The second display unit is configured to: display a message direct control on the page, where the message direct control is configured to highlight a last message of the selected multiple messages on a current page in response to a triggering operation of a user.

Figure 8:
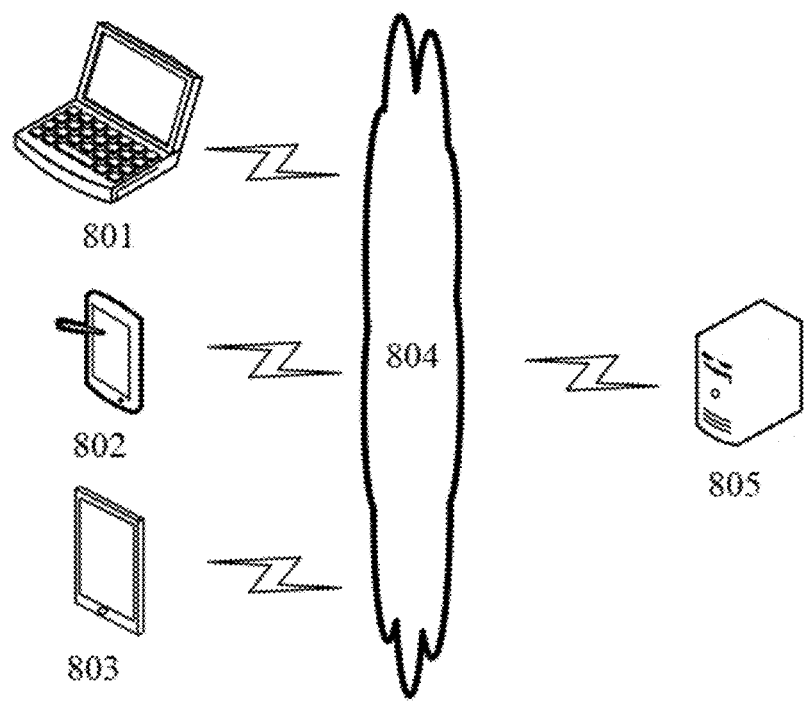
FIG. 8 shows an architecture of a schematic system to which the interaction method according to the embodiment of the present disclosure is applied.

Reference is made to FIG. 8 which shows an architecture of a schematic system to which the interaction method according to the embodiment of the present disclosure may be applied.

As shown in FIG. 8, the system architecture may include terminal devices 801, 802 and 803, a network 804 and a server 805. The network 804 is configured to provide medium of a communication link between the terminal devices 801, 802, 803 and the server 805. The network 804 may include various types of connections, such as wired, wireless communication links or optical fiber cable.

The terminal devices 801, 802 and 803 may interact with the server 805 over the network 804, to receive or transmit messages. The terminal devices 801, 802 and 803 may be installed with various clients, such as webpage browser application, search application and news application. Clients of the terminal devices 801, 802 and 803 may receive a user instruction, and performs corresponding functions in response to the user instruction. For example, the clients add corresponding information in the information in response to the user instruction.

The terminal devices 801, 802 and 803 may be implemented by hardware or software. In a case that the terminal devices 801, 802 and 803 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 801, 802 and 803 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 805 may provide various services. For example, the server 805 is configured to receive an information forwarding request transmitted from the terminal device 801, and forward information indicted by the information forwarding request to the terminal devices 802 and 803 indicated by the information forwarding request.

It should be noted that, the interaction method provided according to the embodiments of the present disclosure may be performed by the terminal devices. Accordingly, the interaction apparatus may be arranged in the terminal devices 801, 802 and 803.

It should be understood that the numbers of terminal device, network and server in FIG. 8 are only schematic. Any number of terminal device, network and server may be provided according to actual need.

Figure 9:
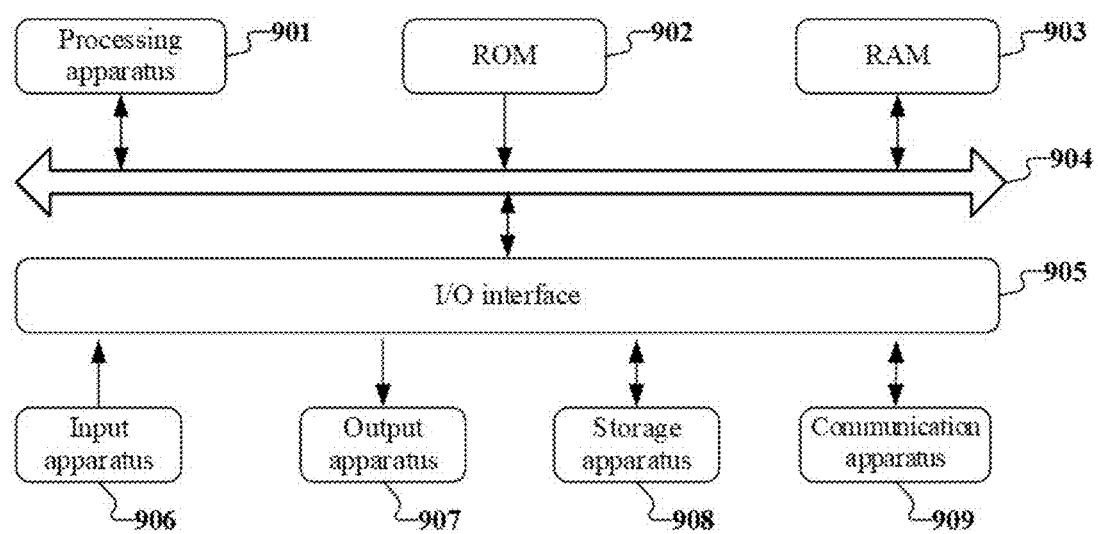
FIG. 9 is a schematic structural diagram of an electronic device according to an embodiment of the present disclosure.

Reference is made to FIG. 9 which shows a schematic structural diagram of an electronic device (for example a terminal device or a server shown in FIG. 8) for implementing the embodiment of the present disclosure. The terminal device in the embodiments of the present disclosure may include but not limited to: mobile terminals such as a mobile phone, a notebook computer, a digital broadcast receiver, a PDA (personal digital assistants), a PAD (tablet computer), a PMP (portable multimedia player), a vehicle-mounted terminal (for example a vehicle-mounted navigation terminal), and fixed terminals such as digital TV and a tablet computer. The electronic device shown in FIG. 9 is only schematic, and does not limit the functions and usage of the embodiments of the present disclosure.

As shown in FIG. 9, the electronic device may include a processing apparatus (such as a central processor and a graphic processor) 901. The processing apparatus may perform various appropriate actions and processing by executing programs stored in a read-only memory (ROM) 902 or programs uploaded from a storage apparatus 908 to a random access memory (RAM) 903. Various programs and data required for operations of the electronic device 900 are also stored in the RAM 903. The processing apparatus 901, the ROM 902 and the RAM 903 are connected to each other through the bus 904. An input/output (I/O) interface 905 is also connected to the bus 904.

Generally, the following components are connected to the I/O interface 905: an input apparatus 906 such as a touch screen, a touch panel, a keyboard, a mouse, a camera, a microphone, an accelerometer, and gyroscope; an output apparatus 907 such as a liquid crystal display (LCD), a loudspeaker and a vibrator; a storage apparatus 908 such as a magnetic tape and a hard disk; and a communication apparatus 909. The communication apparatus 909 may allow the electronic device to communicate with other device in a wired or wireless manner to exchange data. Although FIG. 9 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 909, installed from the storage apparatus 908 or installed from the ROM 902. The computer program is executed by the processing apparatus 901 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable medium may be included in the electronic device described above, or may exist independently and is not installed in the electronic device.

The computer readable storage medium carries one or more programs. The one or more programs, when being executed by the electronic device, causes the electronic device to perform operations: receiving an interaction request for forwarding a target message in an interaction information display page; and in response to determining that the interaction request indicates forwarding multiple messages, determining at least one associated message of the target message and forwarding the target message and the at least one associated message;

or perform operations of: receiving a message processing operation, and displaying preset message processing control when a message displayed on a page satisfies a preset condition, where the preset condition includes: the number of messages currently displayed on the page is greater than a preset number, and/or a message currently selected has a reply relationship with other message; determining multiple messages selected in response to triggering of the message processing control, where the selected multiple messages include a preset number of message, or a message having a reply relationship with the message currently selected; and performing processing indicated by the message processing operation on the selected multiple messages.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in an alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case.

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. An interaction method, comprising:
   displaying an interaction information display page of an instant messaging tool;
   displaying, on the interaction information display page messages exchanged in a chat group, wherein the chat group comprises users of the instant messaging tool;
   receiving an interaction request for forwarding a target message to a user who is not in the chat group, wherein the target message is an existing message in the chat group;
   in response to determining that the interaction request indicates forwarding a plurality of messages among messages in the instant messaging tool, automatically searching the messages in the instant messaging tool and automatically identify at least one associated message of the target message without a user selection; and
   automatically forwarding the target message together with the at least one associated message of the target message to the user who is not in the chat group according to the interaction request.

2. The method according to claim 1, wherein the receiving the interaction request for forwarding the target message comprises:
   receiving an interaction request sent in response to a triggering operation on forwarding control, wherein the forwarding control is configured to forward the plurality of messages.

3. The method according to claim 2, wherein the interaction information display page further comprises a message other than the target message and the associated message of the target message, and the forwarding control is arranged at an associated position of the target message, and/or an associated position of the associated message of the target message.

4. The method according to claim 2,
   wherein the interaction information display page comprises an associated information detail display interface, the forwarding control is displayed in a first preset region of the associated information detail display interface; and the associated information detail display interface displays details of target information and at least one associated information;
   wherein the associated information detail display interface is opened by: displaying the associated information detail page in response to a first preset operation performed on a preset identification corresponding to the target message or the associated message in a first information interaction interface.

5. The method according to claim 1, further comprising:
   determining identification information based on the target message and the at least one associated message, wherein the identification information indicates attribute information of the target message and the at least one associated message.

6. The method according to claim 5, wherein the attribute information comprises conversation user information and/or conversation subject information of a conversation comprising the target message and the associated message.

7. The method according to claim 6,
   wherein the conversation user information comprises at least one of: sender information and/or receiver information of the target message, sender information and/or receiver information of the associated message, and a name information of a chat group if the conversation is group chat; and
   wherein the conversation subject information comprises a specific message character in the target message and the associated message.

8. The method according to claim 1,
   wherein the target message and the at least one associated message comprises at least one first to-be-processed message of which a format is to be converted;
   wherein the method further comprises:
   converting, in response to the interaction request, the format of the first to-be-processed message according to a preset format conversion rule; and
   processing the first to-be-processed message after format conversion when processing the target message and the at least one associated message.

9. The method according to claim 1,
   wherein the at least one associated message comprises at least one non-processable second target message;
   wherein the method further comprises: processing a message other than the at least one non-processable second target message according to the interaction request.

10. The method according to claim 1, wherein the method further comprises:
    determining the at least one associated message of the target message according to a reply relationship between messages, wherein the at least one associated message comprises a message having the reply relationship with the target message.

11. The method according to claim 10, wherein the determining the at least one associated message of the target message according to the reply relationship between messages comprises:
    determining the at least one associated message of the target message based on a pre-stored reply relationship;
    wherein the pre-stored reply relationship is obtained by:
    determining the reply relationship between messages according to a message reply operation, wherein the reply relationship comprises a direct reply relationship and/or an indirect reply relationship.

12. The method according to claim 11, wherein the plurality of messages displayed in a page are stored in a message list, each message in the message list corresponds to a first message identifier and a second message identifier; a first message identifier of one message indicates the message and a second message identifier of the one message indicates a first message identifier of a message replied by the one message;

wherein the determining the at least one associated message of the target message according to the reply relationship between messages comprises:
  determining, in the message list, the at least one associated message having a direct or indirect reply relationship with the target message according to the second message identifiers corresponding to the plurality of messages.

13. The method according to claim 12, wherein the determining, in the message list, the at least one associated message having the direct or indirect reply relationship with the target message according to the second message identifiers corresponding to the plurality of messages comprises:
  determining a direct replying message and an indirect replying message of the target message, according to the first message identifier of the target message, the first message identifier of other message, and the second message identifier of the other message; and/or
  determining a direct replied message and an indirect replied message of the target message, according to the second message identifier of the target message, the first message identifier of the other message, and the second message identifier of the other message.

14. The method according to claim 4, wherein the plurality of messages in the associated information detail display interface have a direct reply and/or indirect reply relationship with the target message.

15. The method according to claim 1, wherein the at least one associated message of the target message comprises a message belonging to a same subject with the target message.

16. A non-transitory computer readable storage medium, bearing computer-readable instructions that upon execution on a computing device cause the computing device to perform operations comprising:
  displaying an interaction information display page of an instant messaging tool;
  displaying, on the interaction information display page messages exchanged in a chat group, wherein the chat group comprises users of the instant messaging tool;
  receiving an interaction request for forwarding a target message to a user who is not in the chat group, wherein the target message is an existing message in the chat group;
  in response to determining that the interaction request indicates forwarding a plurality of messages among messages in the instant messaging tool, automatically searching the messages in the instant messaging tool and automatically identify at least one associated message of the target message without a user selection; and
  automatically forwarding the target message together with the at least one associated message of the target message to the user who is not in the chat group according to the interaction request.

* * * * *